US007689653B2

(12) United States Patent
Cohen et al.

(10) Patent No.: US 7,689,653 B2
(45) Date of Patent: Mar. 30, 2010

(54) APPARATUS AND METHOD CONTROLLING USE OF INDIVIDUAL SEGMENTS OF INSTANT MESSAGING CONTENT (75) Inventors: Gabriel Aaron Cohen, Raleigh, NC (US); Ronald Eugene Craig, Pittsboro, NC (US); Gerald Laverte Mitchell, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1473 days.

(21) Appl. No.: 11/039,776

(22) Filed: Jan. 18, 2005

(65) Prior Publication Data
US 2006/0161630 A1   Jul. 20, 2006

(51) Int. Cl.
G06F 15/16   (2006.01)
(52) U.S. Cl. ..................... 709/206; 709/228
(58) Field of Classification Search .......... 709/206, 709/228, 229
See application file for complete search history.

(56) References Cited

U.S. PATENT DOCUMENTS

| 6,301,609 | B1 | 10/2001 | Aravamudan et al. | 709/207 |
| 6,430,602 | B1 | 8/2002 | Kay et al. | 709/206 |
| 6,510,458 | B1 | 1/2003 | Berstis et al. | 709/219 |
| 2002/0026487 | A1* | 2/2002 | Ogilvie et al. | 709/206 |
| 2003/0041092 | A1 | 2/2003 | Woo | 709/200 |
| 2003/0140106 | A1* | 7/2003 | Raguseo | 709/207 |
| 2004/0078441 | A1 | 4/2004 | Malik et al. | 709/206 |
| 2004/0078596 | A1 | 4/2004 | Kent, Jr. et al. | 713/201 |
| 2004/0148356 | A1* | 7/2004 | Bishop et al. | 709/206 |
| 2005/0132013 | A1* | 6/2005 | Karstens | 709/206 |
| 2006/0041623 | A1* | 2/2006 | Danninger | 709/206 |

(Continued)

FOREIGN PATENT DOCUMENTS

WO   WO 02/065250   8/2002

(Continued)

OTHER PUBLICATIONS

U.S. Appl. No. 10/735,965, Karstens, Methods and Systems of Instant Message Secure Client Control, filed Dec. 15, 2003.

(Continued)

Primary Examiner—Larry Donaghue
(74) Attorney, Agent, or Firm—Joseph E. Bracken; Law Office of Jim Boice (57) ABSTRACT An apparatus and method is provided for a configuration of client work stations for instant messaging, wherein a participant intending to send a particular segment of chat content can elect to send the segment in an "off the record" mode. Content sent in this mode can be viewed but cannot be copied or saved by other instant messaging participants. The apparatus usefully includes a mode select device operable by the participant at a given station to designate each of a succession of chat content segments generated at the given station to be either for unrestricted use, or for off the record use, selectively. The apparatus further includes a component for applying a first use control message to each of the off the records segments sent from the given station to one or more of the other stations. A content control device located at a station receiving the off the record segments is responsive to the applied first use control messages to prevent the receiving station from retaining or otherwise propagating any of the received off the record segments.

20 Claims, 4 Drawing Sheets

U.S. PATENT DOCUMENTS

2006/0149822 A1* 7/2006 Henry et al. ................ 709/206
2008/0147810 A1* 6/2008 Kumar et al. ............... 709/206

FOREIGN PATENT DOCUMENTS

WO    WO 03/105009    12/2003

OTHER PUBLICATIONS

U.S. Appl. No. 10/411,468, Hamilton et al., User Control of Off-Line Messaging, filed Apr. 10, 2003.
Cohen et al., Apparatus and Method for Controlling Use of Instant Messaging Content, filed Jan. 18, 2005.
Cohen et al., Apparatus and Method for Limiting Access to Instant Messaging Content on a Display Screen, filed Jan. 18, 2005.

* cited by examiner

APPARATUS AND METHOD CONTROLLING USE OF INDIVIDUAL SEGMENTS OF INSTANT MESSAGING CONTENT

CROSS-REFERENCE TO RELATED APPLICATIONS

This application is related to commonly assigned and co-pending U.S. patent application Ser. No. 11/039,727 entitled "Apparatus and Method for Controlling Use of Instant Messaging Content"; and U.S. patent application Ser. No. 11/038,323 entitled "Apparatus and Method for Limiting Access to Instant Messaging Content on a Display Screen".

BACKGROUND OF THE INVENTION

1. Technical Field

The invention disclosed and claimed herein generally pertains to an apparatus and method for preventing unintended use or dissemination of information content exchanged between participants during instant messaging conversations. More particularly, the invention pertains to apparatus of the above type wherein respective participants operate client computer terminals or work stations that are remotely located from one another. Even more particularly, the invention pertains to apparatus of the above type wherein each individual segment of instant messaging content generated by a participant is designated to be either for unrestricted use or for controlled use, and participants are prevented from retaining or propagating any controlled use segments.

2. Description of Related Art

Businesses increasingly are relying on a diverse set of electronic communication tools in the work place. Accordingly, security measures that have been in place for some time on more traditional forms of business communications, such as letters, should now be applied to the increasingly broad spectrum of electronic business communications. This is necessary to control propagation and prevent unintended dissemination of sensitive business information.

Previously, efforts made to prevent proliferation of information in the new electronic mediums for communication have generally been directed to email. One solution in the email space is to attach a flag to an email which prevents the forwarding of the email. This flag can also prevent clipboard copying of the text. However, in the case of email this can be easily thwarted, such as by taking pictures of the screen or using a non-compliant email system.

Another important type of electronic communication is known by those of skill in the art as instant messaging, or chat. In an instant messaging or chat conversation, two or more participants operate client work stations that are remotely located from one another, but are also interconnected to enable bidirectional communication by all participants. Thus, one participant can send a message to another, and immediately receive back a response or reply. The instant messaging configuration enables participants located at different places to discuss a topic, or to discuss multiple topics. Moreover, the configuration can remain in place over time, so that the participants can exchange messages during a period extending over days or longer.

It will be readily apparent that a great deal of important and valuable information content can be generated and exchanged in the course of an instant messaging or chat conversation or event. Thus, as this communication medium is increasingly used in the work place, it becomes necessary to enforce controls on the use that is made of content generated through this medium. In the past, improper use of this medium and content produced thereby has resulted in misunderstandings, dissemination of private information and disclosure of sensitive business data. Currently, transcripts can be saved and forwarded, and text can be clipped and copied. Often out of context, chat content may be sent along through an unpredictable chain to the wrong parties. Moreover, certain solutions available in the email space generally do not apply in the realm of instant messaging. Unlike email, content in the medium of instant messaging is not discrete, in the sense that it is not neatly divided into individual notes which can be identified by subject and marked as sensitive. Thus, it is necessary to control the information contained within a chat transcript more granularly, even line by line. Also, since chat content is often non-topical in nature, a chat configuration involving two or more participants can remain open for days at a time, and can cover a variety of unrelated subjects.

BRIEF SUMMARY OF THE INVENTION

The invention generally pertains to a configuration of client work stations for instant messaging or chat conversations, wherein each station user or participant is able to control every segment of chat content that he/she generates, or contributes. More particularly, each participant can select or toggle a mode in the instant messaging conversation, referred to for example as an "off the record" mode. Content contributed by the participant in this mode can be viewed, but cannot be copied or saved by other participants in the instant messaging conversation. Thus, embodiments of the invention basically provide a "per line" security policy for a chat transcript, wherein the transcript is the total material contributed by all the chat participants collectively, during the entire instant messaging conversation. In one embodiment, directed to a configuration of client work stations interconnected to allow instant messaging between participants at respective stations, apparatus is provided for controlling selected instant messaging content. The apparatus comprises a mode select device operable by the participant at a given station to designate each of a succession of chat content segments generated at the given station to be either for unrestricted use, or for off the record use, selectively. The apparatus further comprises a component for applying a first use message to each of the off the record segments sent from the given station to one or more of the other stations. A content control device, located at a station receiving one or more of the off the record segments from the given station, is responsive to the first use messages respectively applied to received segments to prevent the receiving station from retaining or otherwise propagating the received off the record segments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
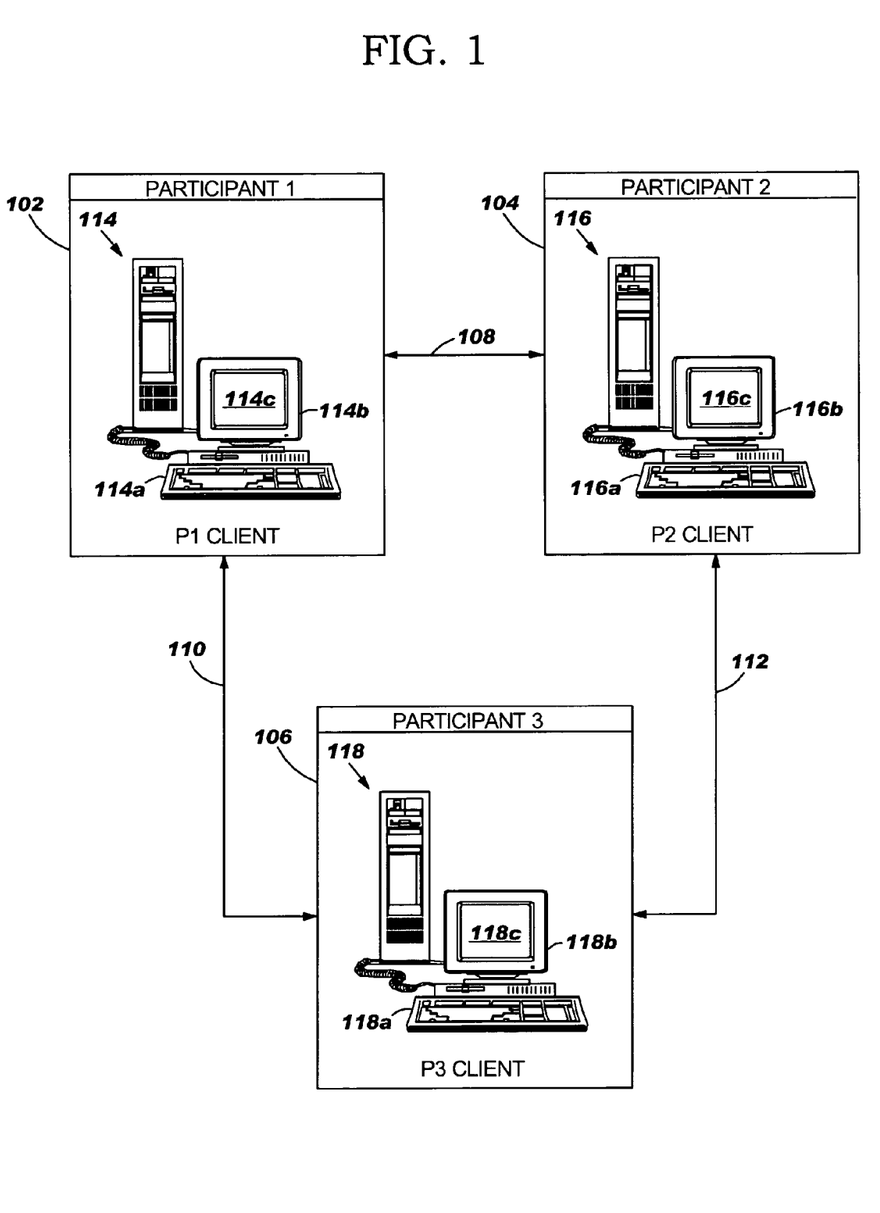
FIG. 1 is a schematic diagram showing a configuration of client work stations for implementing an embodiment of the invention.

Referring to FIG. 1, there is shown a configuration of clients or client work stations 102-106, wherein each client is connected to every other client by means of bidirectional communication links or paths 108-112. As used herein, the terms "client" and "client work station" refer to a computer work station or other data processing work station operable by a user to communicate with other computer work stations, over a network or other communication path. Communication paths 108-112 may comprise, for example, segments of the Internet, wireless communication links, or electro-optical communication paths, such as fiber optic cables. Thus, Participants 1-3, shown by FIG. 1 to be located at clients 102-106 respectively, may operate their respective client work stations to exchange information with one another. More particularly, Participants 1-3 of clients 102-106 are disposed to engage in instant messaging or chat communication or conversations with one another, as described above. Propagation of the chat information content disclosed among the instant messaging participants is intended to be controlled or regulated in accordance with an embodiment of the invention, as described herein.

As used herein, the terms "propagate", "propagation" and any variations thereof are broadly defined, to include any acts whereby content is transferred to or stored or reproduced at a location external to a client computer, and to further include retention or storage of content within the client computer such that, at some time in the future, content could be transferred to or stored or reproduced at a location external to the client computer.

FIG. 1 further shows computer terminals 114-118 respectively located at client work stations 102-106, to be operated by Participants 1-3 for instant messaging. Computer terminals 114-118 are respectively provided with keyboards 114a-118a and monitors 114b-118b. The monitors 114b-118b respectively include display screens 114c-118c.

Figure 2:
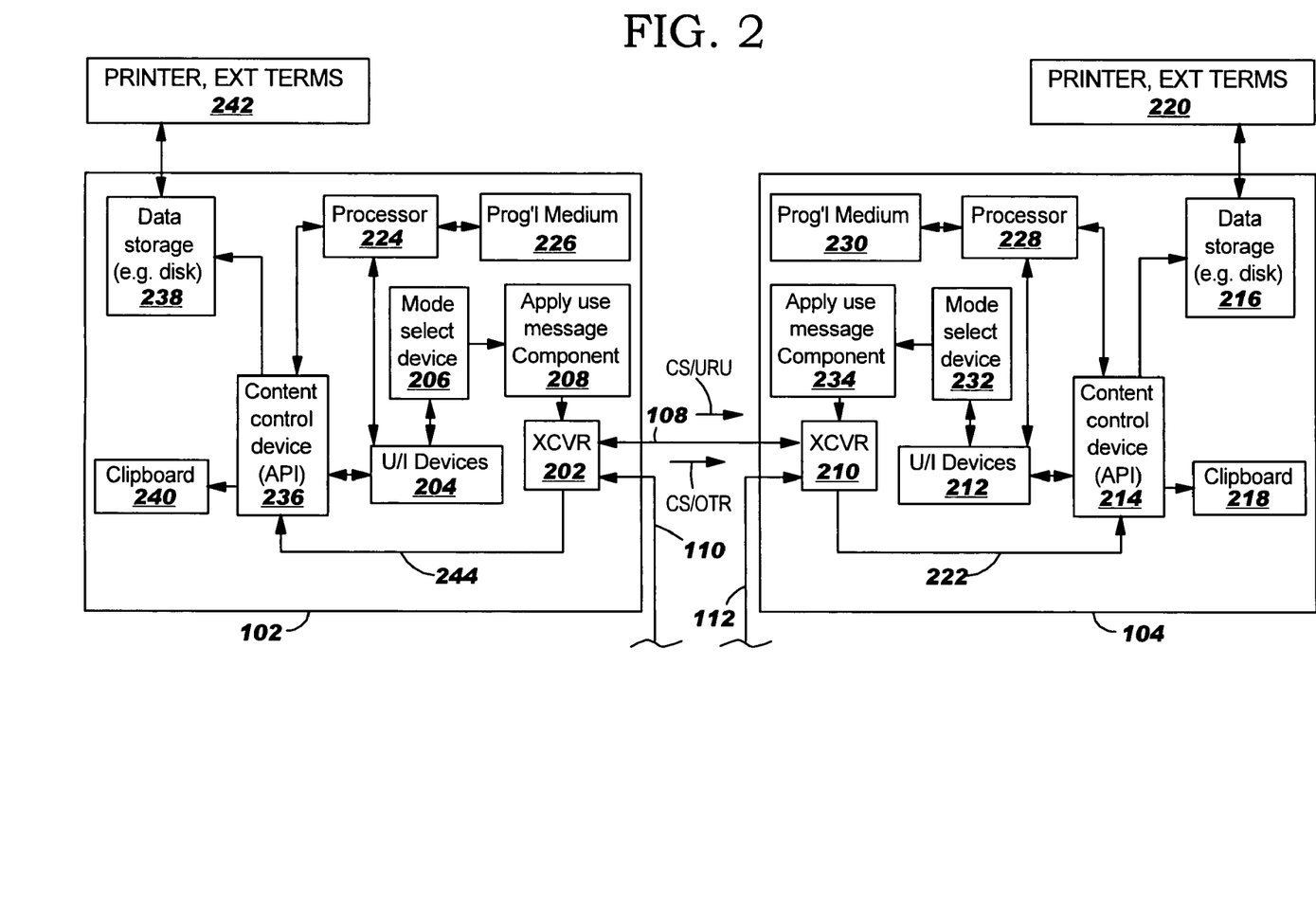
FIG. 2 is a block diagram showing components at respective client work stations of FIG. 1 for implementing an embodiment of the invention.

Referring to FIG. 2, there are shown client stations 102 and 104 respectively provided with components for implementing an embodiment of the invention. Referring specifically to client 102, there is shown a transceiver 202 connected to send and receive message data over links 108 and 110. Transceiver 202, by way of example and not limitation, may alternatively include a modem configured to access the Internet, an RF transceiver for accessing a wireless network, or an electro-optic coupling device for connecting to a fiber optic transmission path. Transceiver 202 also includes any components needed for data conversion, in order to enable data exchanges between transceiver 202 and user interface (U/I) devices 204 of client 102. In FIG. 2, U/I devices 204 is intended to collectively include all individual user interface devices that client 102 is provided with, which will occur to those of skill in the art. U/I devices 204 may include, for example, a monitor or display device 114b as described above, for enabling Participant 1 to view incoming instant messaging or chat content received by transceiver 202. U/I devices 204 may further include a keyboard 114a or the like for use in generating segments of instant messaging content that are to be sent out from client 102 to other chat conversation participants.

In accordance with useful embodiments of the invention, when client 102 is engaged in an instant messaging conversation or activity, the display screen 114c of monitor 114b displays a set of content use control elements, for use by Participant 1 to select one of two use control modes. Participant 1 would select an off the record mode, in association with a chat content segment, if Participant 1 sought to prevent other participants in the chat conversation from saving or otherwise propagating the segment. However, if the content segment is intended to be made freely available to other participants, without any need to restrict or limit its use, Participant 1 would select an unrestricted use mode.

In one embodiment, described hereinafter in connection with FIG. 3, the control elements would comprise two buttons. The buttons would be displayed on the work station monitor of client 102 when the station was engaged in instant messaging. In another embodiment, described hereinafter in connection with FIG. 4, the control elements would comprise a single button and a check box. The control elements would be used to select a mode for each discrete segment of instant messaging content generated at client 102.

FIG. 2 further shows a mode select device 206, interconnected to U/I devices 204. Device 206 represents all the structural components and other capability required to display the above control elements on screen 114c, as well as to produce mode select signals, described hereinafter, in response to operation of the control elements.

In another embodiment, the mode select device can comprise a two mode physical switch, manually operated by Participant 1 to specify one of the two modes for controlling content segment use.

Referring further to FIG. 2, there is shown a component 208 connected to receive the mode select signals from mode select device 206. Each mode select signal corresponds to a content segment, and indicates the use control mode that has been selected for its segment. Component 208 responds to the mode select signals by attaching mode messages or other identifiers to respective segments, to indicate the intended level of use control. If a content segment is to be transmitted from client 102 by means of a data packet, the packet could be provided with a mode identifier comprising a single bit, set to either one or zero. Alternatively, a flag could be set, to indicate off the record mode. The content segment, after attachment of the mode message as described above, is sent from transceiver 202 to the other clients. FIG. 2 shows a content segment with an unrestricted use mode message (CS/URU) being sent to client 104, and further shows a content segment with an off the record message (CS/OTR) likewise being sent thereto.

Referring now to client 104 in FIG. 2, there is shown a transceiver 210 and U/I devices 212. There is further shown a content control device 214 positioned between U/I devices 212 and all data storage capability 216 of client 104. Data storage 216 shown in FIG. 2 is intended to include the hard drive as well as all other disks and devices used to store data within client 104. FIG. 2 further shows that any messages to be sent to clipboard 218 of client 104 must likewise be routed through content control device 214. Thus, any instant message content segment received by client 104 can be viewed by means of a U/I device 210. However, the segment content cannot be saved or stored in client 104, unless this is permitted by content control device 214. Moreover, FIG. 2 shows that any connection to a printer or other terminals 220 external to client 104 must be made through data storage 216. Accordingly, content control device 214 may also be used to prevent or selectively limit the printing of received chat messages, and the transfer thereof to any computers or other devices that are external to client 104.

When transceiver 210 receives a content segment from client 102 with a use mode message as described above, an instruction representing the indicated mode is sent to content control device 214 over a link 222. If the indicated use mode is off the record or CS/OTR, the instruction operates device 214 to prevent the associated segment, in its entirety, from passing to data storage 216 or clipboard 218. On the other hand, if the indicated mode allows unrestricted use, the corresponding instruction operates content control device 214 to allow the entire content segment to pass freely to either data storage 216 or the clipboard 218. In one useful implementation, content control device 214 includes an application programmable interface (API) that is operated as described above by the instructions sent thereto over link 222.

FIG. 2 further shows client 102 provided with a processor 224 and a programmable or computer readable medium 226, of selected type, for use in storing software used to control operation of respective components of client 102, as described above. Client 104 is similarly provided with a processor 228 and a programmable medium 230. Moreover, client 104 is provided with a mode select device 232, and with a component 234 for applying use mode messages to content segments sent from client 104. Client 102 is provided with a content control device 236, a data storage 238, a clipboard 240, a link 244, and a printer and external terminals 242 connected to the data storage 238. Each of the components of client 104 is similar or identical to the corresponding component shown in client 102, and has functions and interconnections that are respectively similar or identical thereto, as described above.

Thus, each of the clients 102-106 can be operated to both send and receive instant messaging content segments in accordance with embodiments of the invention, as described above. The data storage of a client, such as data storage 216 of client 104, could readily be configured to store all the content segments exchanged during an instant messaging conversation that were designated to be for unrestricted use. However, none of the off the record segments would be contained in storage 216. Thus, at the end of the instant messaging conversation, data storage 216 could be accessed to immediately provide a transcript of the entire conversation, except for the portions thereof that were off the record. These portions would automatically be omitted from the transcript.

Figure 3:
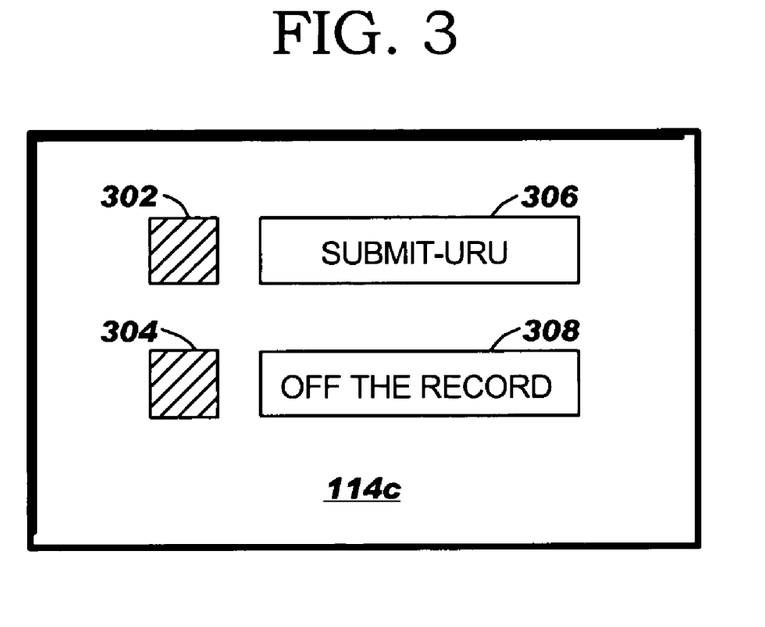
FIG. 3 depicts graphics appearing on a display screen in connection with an embodiment of the invention.

Referring to FIG. 3, there is shown display screen 114*c* displaying buttons 302 and 304 when client 102 is in an instant messaging mode. Screen 114*c* further shows text boxes 306 and 308 adjacent to buttons 302 and 304, respectively. Text box 306 contains the text "SUBMIT-URU" and text box 308 contains the text "OTR". Thus, when a chat content segment is to be sent from client 102 to other clients, Participant 1 can use button 302 to allow unrestricted use of the segment, and can use button 304 to keep the segment off the record.

Figure 4:
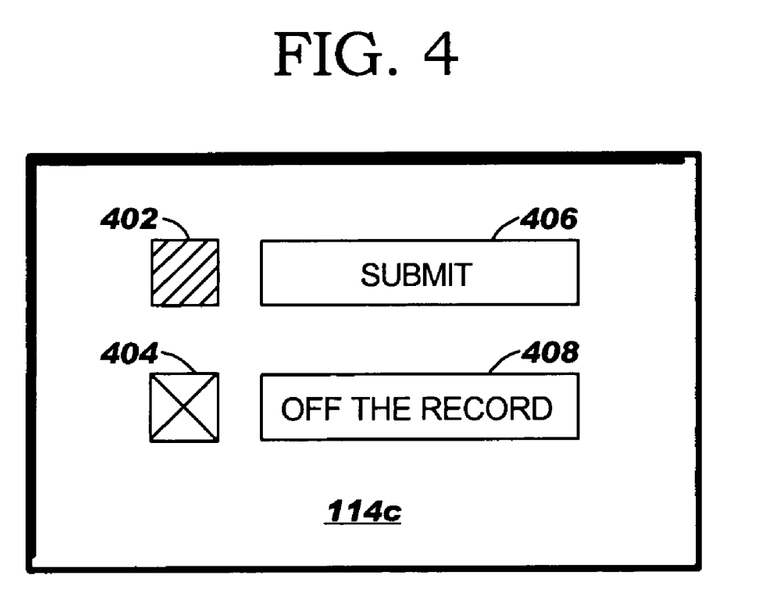
FIG. 4 depicts graphics appearing on a display screen in connection with a further embodiment of the invention.

Referring to FIG. 4, there is shown display screen 114*c* displaying a button 402 and a check box 404, when client 102 is in an instant messaging mode. Screen 114*c* further shows text boxes 406 and 408 adjacent to button 402 and check box 404, respectively. Text box 406 always contains the text "SUBMIT". However, text box 408 contains the text "OFF THE RECORD" only when a check has been placed in box 404, as shown in FIG. 4. However, when the check is absent from box 404 (not shown), the text in box 408 will be "UNRESTRICTED USE" (not shown). With the arrangement shown in FIG. 4, each chat content segment to be contributed by client 102 would be sent to other clients by pressing the submit button 402. The use mode attached to the submitted segment would be determined by the presence or absence of a check in check box 404.

Figure 5:
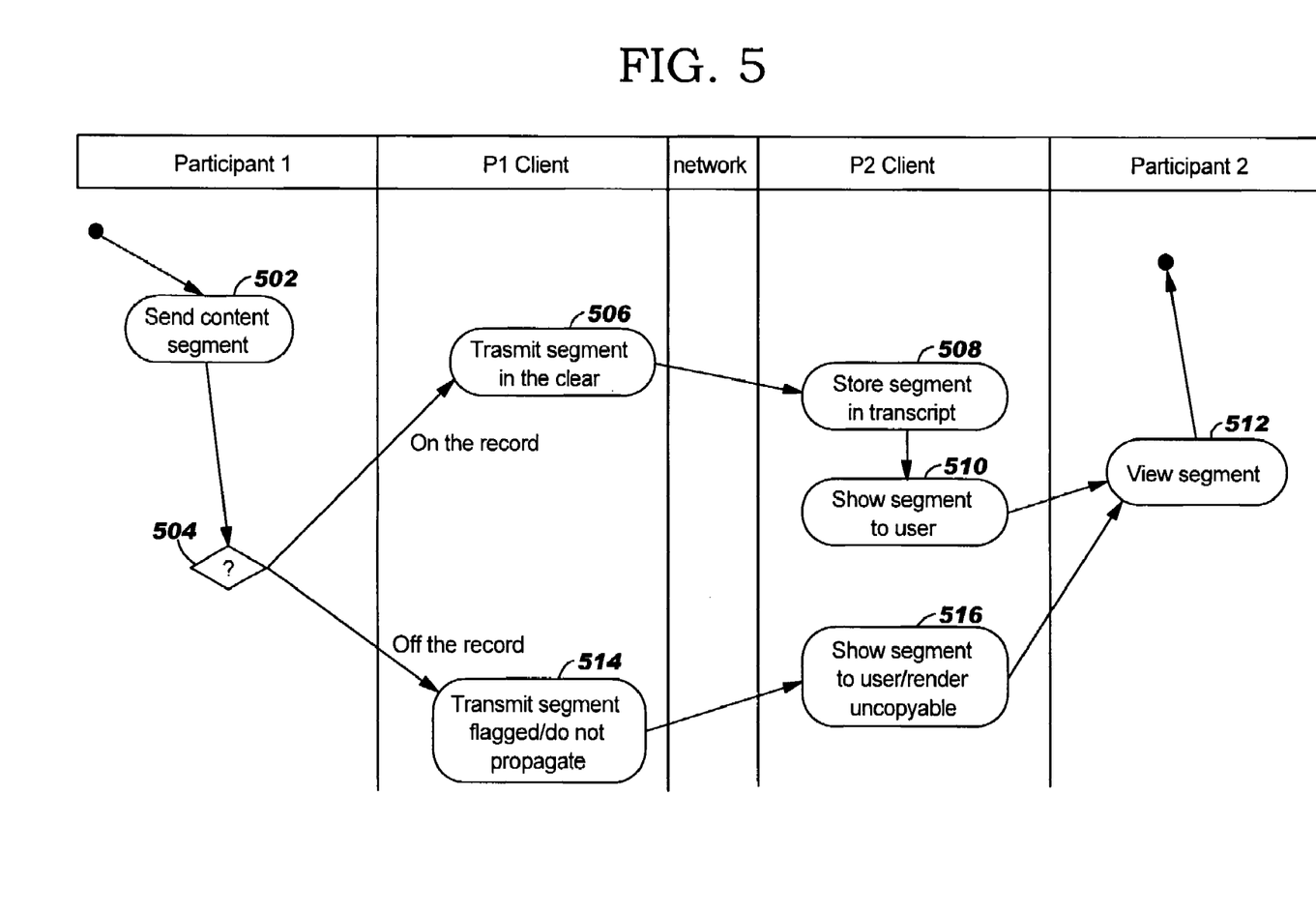
FIG. 5 is a flowchart illustrating an embodiment of the invention.

Referring to FIG. 5, there is shown a flow chart further illustrating operation of client stations 102 and 104, in accordance with an embodiment of the invention. Function box 502 shows Participant 1 intending to send a segment of content to Participant 2 during an instant messaging conversation. Before transmitting the segment however, Participant 1 must first decide whether to send the segment on the record or off the record, as indicated by decision block 504.

If the segment is to be sent on the record, it will be transmitted to client 104 in the clear, as shown by function block 506. That is, the content segment will be sent with the unrestricted use message CS/URU, as described above. Accordingly, client 104 will be able to enter the segment into the instant messaging conversation transcript in data storage 216, in addition to presenting the segment to Participant 2 for viewing by means of the U/I devices 212. These tasks are respectively shown by function blocks 508, 510, and 512 of FIG. 5.

Referring further to FIG. 5, if the segment is to be sent off the record as shown by function block 514, the message CS/OTR will be applied to the segment. As described above, such message could simply comprise a flag. In response to the CS/OTR message, content control device 214 allows the segment to be viewed by means of U/I devices 212, but prevents the segment from being stored or copied into data storage 216 or clipboard 218. This is shown by function block 516.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for controlling selected chat content produced by instant messaging, wherein said apparatus comprises:

a mode select hardware device operable by a participant at a sending station to selectively designate each of a succession of chat content segments generated at the sending station to be either for unrestricted use, or for off the record use; and a hardware component for applying a first use control message to each of said segments designated for off the record use that is sent from said sending station directly to one or more receiving stations, wherein the first use control message is configured to cause said one or more receiving stations to respond to the first use control message by preventing said chat content segments from being transferred to another computer.

2. The apparatus of claim 1, wherein:
each station of a configuration of client work stations is provided with a mode select device, a content control device, and a component for applying first use control messages, wherein the configuration of client work stations comprises at least one sending station and at least one receiving station.

3. The apparatus of claim 2, wherein:
said hardware component for applying first use control messages is adapted to apply second use control messages to chat content segments that are respectively designated to be for unrestricted use; and wherein
said content control device is responsive to a particular second use control message to enable a station receiving said particular second use control message and its associated content segment to save or otherwise propagate said associated content segment.

4. The apparatus of claim 1, wherein:
said mode select hardware device is adapted to display first and second buttons, wherein said buttons are operable by the participant at said sending station to transmit a given content segment and to designate said given content segment as being either for unrestricted use or for off the record use, selectively.

5. The apparatus of claim 1, wherein:
said mode select hardware device is adapted to display a single button and a check box, a given content segment being sent from said sending station when said button is operated by said participant, and the presence or absence of a check in said check box determining whether a first use control message is applied to the given content segment.

6. The apparatus of claim 1, wherein:
said first use control message comprises a flag attached to the corresponding content segment.

7. The apparatus of claim 1, wherein:
said content control device is provided with an application programmable interface (API) that is operated by a first use control message applied to a received off the record segment to prevent said receiving station from retaining or otherwise propagating said received off the record segment.

8. The apparatus of claim 2, wherein:
said apparatus further comprises a device for producing a transcript at a conclusion of an instant messaging event, wherein said transcript includes all chat content segments designated for unrestricted use, and automatically excludes all chat content segments designated for off the record use.

9. A computer implemented method comprising:
designating, by at least one specific processor, each of a succession of chat content segments generated at a given station to be either for unrestricted use, or for off the record use, selectively; and
applying a first use control message to each of said chat content segments designated for off the record use that is directly sent from said given station to one or more other remote stations, wherein said chat content segments are directly transmitted to said one or more other remote stations, and wherein the first use control message causes said one or more other remote stations to respond to the first use control message by preventing said chat content segments from being transferred to another computer.

10. The computer implemented method of claim 9, wherein:
each station in a configuration of client work stations is provided with a mode select device, a content control device, and a component for applying first use control messages.

11. The computer implemented method of claim 9, wherein:
second use control messages are applied to chat content segments that are respectively designated to be for unrestricted use.

12. The computer implemented method of claim 9, wherein:
first and second buttons displayed by a mode select device are operated by a participant at said given station to transmit a given content segment and to designate said given content segment to be either for unrestricted use or for off the record use, selectively.

13. The computer implemented method of claim 9, wherein:
a single button and a check box displayed by a mode select device are operated by the participant at said given station to transmit and designate a given content segment to be either for unrestricted use or for off the record use, selectively.

14. The computer implemented method of claim 12, further comprising:
producing a transcript at a conclusion of an instant messaging event, wherein said transcript includes all chat content segments designated for unrestricted use, and automatically excludes all chat content segments designated for off the record use.

15. A computer-recordable medium for controlling selected chat content produced by the instant messaging, wherein said tangible computer storage medium comprises:
first instructions for receiving each of a succession of chat content segments at a first station, wherein each of said segments is generated at a second station and is designated to be either for unrestricted use or for off the record use, selectively, a first use control message being applied to each of said segments designated for off the record use;
second instructions for detecting each segment received at said first station that has a first control use message and is thereby identified to be an off the record segment; and
third instructions for using the first use control messages respectively applied to said received off the record segments to prevent said first station from retaining or otherwise propagating said received off the record segments.

16. The computer-recordable medium of claim 15, wherein:
each station of a configuration of work stations is provided with a mode select device, a content control device, and a component for applying first use control messages, wherein the configuration of work stations comprises the first station and the second station.

17. The computer-recordable medium of claim 15, wherein:
second use control messages are applied to chat content segments that are respectively designated to be for unrestricted use.

18. The computer-recordable medium of claim 16, wherein:

said mode select device at said second station is adapted to display first and second buttons, wherein said buttons are operable by the participant at said second station to transmit and designate a given content segment as being either for unrestricted use or for off the record use, selectively.

19. The computer-recordable medium of claim 16, wherein:

said mode select device at said second station is adapted to display a single button and a check box, a given content segment being sent from said second station when said button is operated by the participant at said second station, and the presence or absence of a check in said check box determines whether a first use control message is applied to the given content segment.

20. The computer-recordable medium of claim 15, wherein:

fourth instructions are provided for producing a transcript at a conclusion of an instant messaging event, wherein said transcript includes all chat content segments designated for unrestricted use, and automatically excludes all chat content segments designated for off the record use.

* * * * *